US009826761B2

(12) United States Patent
McNeff et al.

(10) Patent No.: US 9,826,761 B2
(45) Date of Patent: Nov. 28, 2017

(54) COMPOSITIONS AND METHODS FOR MITIGATING DIETARY SULFUR IN ANIMALS

(75) Inventors: Larry C. McNeff, Anoka, MN (US); Clayton V. McNeff, Andover, MN (US); Peter G. Greuel, Anoka, MN (US); Mark Axel Rasmussen, Severn, MD (US); Sharon Franklin, Severn, MD (US)

(73) Assignee: SarTec Corporation, Anoka, MN (US)

( * ) Notice: Subject to any disclaimer, the term of this patent is extended or adjusted under 35 U.S.C. 154(b) by 1001 days.

(21) Appl. No.: 12/572,187

(22) Filed: Oct. 1, 2009

(65) Prior Publication Data

US 2010/0173040 A1 Jul. 8, 2010

Related U.S. Application Data

(60) Provisional application No. 61/102,753, filed on Oct. 3, 2008.

(51) Int. Cl.
*A23K 1/175* (2006.01)
*A23K 50/10* (2016.01)
*A23K 10/30* (2016.01)
*A23K 20/121* (2016.01)
*A23K 20/163* (2016.01)
*A23K 20/10* (2016.01)
*A23K 20/20* (2016.01)

(52) U.S. Cl.
CPC .............. *A23K 50/10* (2016.05); *A23K 10/30* (2016.05); *A23K 20/10* (2016.05); *A23K 20/121* (2016.05); *A23K 20/163* (2016.05); *A23K 20/30* (2016.05)

(58) Field of Classification Search
CPC ...... A23K 1/14; A23K 1/1618; A23K 1/1813; A23K 1/1646; A23K 1/1758; A23K 1/1643; A23K 50/10; A23K 20/163; A23K 20/30; A23K 10/30; A23K 20/10; A23K 20/121
USPC .................. 426/74, 615, 635, 807
See application file for complete search history.

(56) References Cited

U.S. PATENT DOCUMENTS

| | | | |
|---|---|---|---|
| 2,489,762 A | 11/1949 | Dunn et al. | |
| 3,682,644 A * | 8/1972 | Nagakura | 426/2 |
| 3,950,372 A | 4/1976 | Abdel-Monem | |
| 4,182,755 A | 1/1980 | McNeff | |
| 4,478,935 A | 10/1984 | Williams et al. | |
| 4,851,244 A * | 7/1989 | Theuninck et al. | 426/74 |
| 4,963,366 A * | 10/1990 | Thomas | 424/601 |
| 5,043,171 A * | 8/1991 | Bichsel et al. | 426/74 |
| 5,139,779 A * | 8/1992 | McNeff | 424/750 |
| 5,145,695 A | 9/1992 | Smith et al. | |
| 5,501,857 A | 3/1996 | Zimmer | |
| 5,518,750 A | 5/1996 | McNeff | |
| 6,410,305 B1 * | 6/2002 | Miller et al. | 435/268 |
| 2002/0136751 A1 * | 9/2002 | Puritch | 424/410 |
| 2006/0024387 A1 * | 2/2006 | McNeff et al. | 424/725 |
| 2006/0204554 A1 | 9/2006 | Cecava et al. | |
| 2007/0071849 A1 | 3/2007 | McNeff | |

FOREIGN PATENT DOCUMENTS

| | | |
|---|---|---|
| GB | 634582 | 3/1950 |
| WO | WO 2010/040070 A1 | 4/2010 |

OTHER PUBLICATIONS

Partington. A Text book of Inorganic Chemistry, Publishers: Macmillan & Co. London, 1965, pp. 904-905.*
Parkes. Mellor's Modern Inorganic Chemistry, Publishers: Longmans, Green & Co. Ltd. London, 1961, pp. 894-895.*
Sidgwick The Chemical Elements and their compounds, vol. 2, Publishers: Oxford at the Clarendon Press, 1951, pp. 1273, 1276-1277.*
Fenwick et al. J. Sci. Food Agric. 1983, 34, 186-191.*
Jooyoung Park et al. Environ. Sci. Technol. 2006, vol. 40, pp. 3030-3035.*
"Saponin" downloaded from http://en.wikipedia.org/wiki/Saponin; dated Sep. 2008, 5 pages.*
"Ferrous Chloride Solution" downloaded from http://www.gulbrandsen.com/GTI_prod_4_3_04.shtml; dated Jan. 2001, 2 pages.*
Cheeke "Saponins: Surprising benefits of desert plants", 3 pages, dated 1998, downloaded from http://lpi.oregonstate.edu/sp-su98/saponins.html.*
Gould J. Anim. Sci. 1998, vol. 76, pp. 309-314.*
Pandher Kansas State Veterinary Quarterly, vol. 3, No. 2, May-Jul. 2000, 2 pages.*
Gould et al. JAVMA, vol. 221 (5), 2002.*
Güçlü-Üstündağ O et l. Crit Rev Food Sci Nutr. 2007;47(3):231-58.*

(Continued)

*Primary Examiner* — Chhaya Sayala
(74) *Attorney, Agent, or Firm* — Pauly, DeVries Smith & Deffner LLC

(57) ABSTRACT

The invention is related to compositions including sulfide binding agents and related methods. In an embodiment, the invention includes a composition including saponins, and a sulfide binding agent, the sulfide binding agent comprising a metal containing compound. In an embodiment, the invention includes a method of processing animal feed including contacting an animal feed material with a composition, the composition comprising a sulfide binding agent, the sulfide binding agent comprising a metal containing compound. In an embodiment, the invention includes a method of treating animals for dietary sulfur overload including administering to an animal an effective amount of a composition comprising a sulfide binding agent, the sulfide binding agent comprising a metal containing compound. In an embodiment, the invention includes a method for reducing ruminal sulfide concentrations including administering to an animal an effective amount of a composition comprising a sulfide binding agent, the sulfide binding agent comprising a metal containing compound. Other embodiments are included herein.

12 Claims, 5 Drawing Sheets

(56) References Cited

OTHER PUBLICATIONS

Ryan et al. "Realistic Rations" downloaded from www.dpi.nsw.gov.au/agriculture/livestock/dairy-cattle/feed/publications/realistic-rations, dated Jan. 18, 2006, Appendices, 13 pages.*
Henry et al. abstract, "Bioavailability of nutrients for animals, amino acids, minerals and vitamins", 1995, pp. 169-199.*
"AC Keratin Hydrolysate" Technical data sheet, 2 pages, downloaded from http://www.rectiwa.com/, dated May 4, 2005.*
Gould, Daniel H. et al., "In vivo indicators of pathologic ruminal sulfide production in steers with diet-induced polioencephalomalacia", J. Vet. Diagn. Invest. 1997, 9:72-76.
Unknown, , "Nutrient Requirements of Beef Cattle", Subcommitte on Beef Cattle Nutrition, Committee on Animal Nutrition, Board on Agriculture, National Research Council 1996.
"PCT Notification Concerning Transmittal of International Preliminary Report on Patentability", from International Application No. PCT/US2009/059403, corresponding to U.S. Appl. No. 10/976,193, dated Apr. 14, 2011, pp. 1-8.
"PCT International Search Report and Written Opinion", from International Application No. PCT/US2009/059403, corresponding to U.S Appl. No. 12/572,187, dated Feb. 22, 2010, pp. 1-5.
Gaskin, Julia W. et al., "Long-term biosolids application effects on metal concentrations in soil and bermudagrass forage", J. Environ. Qual., vol. 23,2003, XP002564347, pp. 146-152.
Tiffany, M. E. et al., "Effects of pasture applied biosolids on performance and mineral status of grazing beef heifers", J. Anim. Sci., vol. 78,2000, XP002564348, pp. 1331-1337.
Tiffany, et al., "Effects of Pasture Applied Biosolids on Performance and Mineral Status of Grazing Beef and Heifers", Journal of Animal Science, vol. 78, No. 5, 2000, pp. 1331-1337.
"First Examiner's Report", for Australian Patent Application No. 2009298189, dated Oct. 11, 2013 (5 pages).
Gaskin, et al., "Long-Term Biosolids Application Effects on Metal Concentrations in Soil and Bermudagrass Forage", Journal of Environmental Quality, vol. 32, No. 1, 2003, pp. 146-152.
"Office Action", from MX Application No. MX/a/2011/003525, dated Sep. 19, 2013, 3 pages.
Sidwick,, "The Chemical Elements and Their Compounds", vol. 2, Publishers: Oxford at the Clarendon Press, 1951, pp. 1273, 1276-1277.
Non-Final Office Action, for MX Application No. MX/a/2011/003525, dated May 7, 2014 (8 pages).
The Merck Veterinary Manual, "Bloat in Ruminants", Mar. 2012, at http://www.merckmanuals.com/vet/digestive_system/diseases_of_the_ruminant_forestomach/bloat_in_ruminants.html (accessed Jul. 31, 2014), 7 pages.
"Notice Acceptance," for Australian Patent Application No. 2009298189, dated Jul. 14, 2015 (3 pages).
"Office Action," for Mexican Patent Application No. MX/a/2011/003525, dated Nov. 5, 2014 (3 pages).English translation only.
"Second Examiner Report," for Australian Patent Application No. 2009298189, dated Jul. 2, 2015 (3 pages).

* cited by examiner

US 9,826,761 B2

COMPOSITIONS AND METHODS FOR MITIGATING DIETARY SULFUR IN ANIMALS

This application claims the benefit of U.S. Provisional Application No. 61/102,753, filed Oct. 3, 2008, the content of which is herein incorporated by reference in its entirety.

FIELD OF THE INVENTION

The invention is related to compositions including sulfide binding agents and related methods. In particular, the invention is related to compositions including sulfide binding agents useful for mitigating dietary sulfur and related methods.

BACKGROUND OF THE INVENTION

Sulfur is an essential element to many organisms. Sulfur is a component of various compounds essential to life including methionine, cysteine, the B-vitamins, thiamine, and biotin, amongst others.

Sources of dietary sulfur can include feed stocks with significant amounts of sulfur. As an example, some byproducts from ethanol production, such as distillers dried grains, may sometimes include significant amounts of sulfur. Sources of dietary sulfur can also include water that has significant sulfur content. In some geographic regions, groundwater can be contaminated with high amounts of naturally occurring sulfur.

In many cases, sulfur is ingested in the form of sulfate compounds. In the rumen of an animal, the sulfate compounds can then be converted by microbes into hydrogen sulfide.

Unfortunately, an excess of dietary sulfur (or dietary sulfur overload) can lead to various negative effects. Excess sulfur can result in restlessness, diarrhea, muscular twitching, dyspnea, and even death. Sulfur in the form of sulfide is a particularly potent neurotoxin that can rapidly produce unconsciousness and death. In the agricultural context, elevated concentrations of sulfur have been shown to result in reduced feed intake and diminished growth of animals.

Accordingly, a need exists for methods and compositions for mitigating dietary sulfur.

SUMMARY OF THE INVENTION

The invention is related to compositions including sulfide binding agents and related methods. In an embodiment, the invention includes a composition including saponins and a sulfide binding agent, the sulfide binding agent comprising a metal containing compound.

In an embodiment, the invention includes a method of processing animal feed including contacting an animal feed material with a composition, the composition comprising a sulfide binding agent, the sulfide binding agent comprising a metal containing compound.

In an embodiment, the invention includes a method of treating animals for dietary sulfur overload including administering to an animal an effective amount of a composition comprising a sulfide binding agent, the sulfide binding agent comprising a metal containing compound.

In an embodiment, the invention includes a method of treating animals for dietary sulfur overload including identifying animals with ruminal concentrations of sulfide ion exceeding a threshold amount, the threshold amount comprising 100 ppm; and administering to the identified animals an effective amount of a composition comprising a sulfide binding agent, the sulfide binding agent comprising a metal containing compound.

In an embodiment, the invention includes a method of treating animals including identifying animals subject to high dietary intake of sulfur; and administering to the identified animals an effective amount of a composition comprising a sulfide binding agent, the sulfide binding agent comprising a metal containing compound.

In an embodiment, the invention includes a method for reducing ruminal sulfide concentrations including administering to an animal an effective amount of a composition comprising a sulfide binding agent, the sulfide binding agent comprising a metal containing compound.

In an embodiment, the invention includes a method of increasing the feed intake of animals including administering to an animal an effective amount of a composition comprising a saponin composition and a sulfide binding agent, the sulfide binding agent comprising a metal containing compound.

In an embodiment the invention includes a method of increasing the average daily weight gain of animals comprising administering to an animal an effective amount of a composition comprising a saponin composition and a sulfide binding agent, the sulfide binding agent comprising a metal containing compound.

The above summary of the present invention is not intended to describe each discussed embodiment of the present invention. This is the purpose of the detailed description that follows.

DETAILED DESCRIPTION OF THE INVENTION

Figure 1:
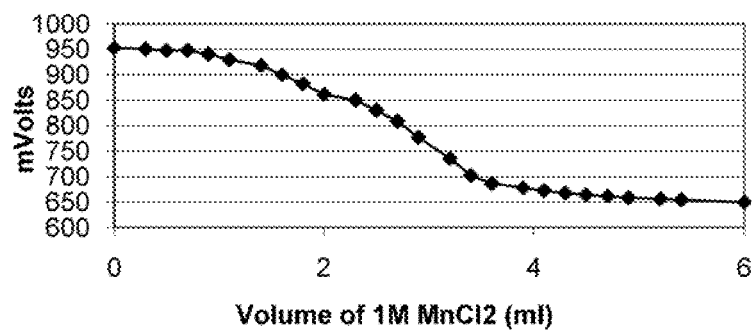
FIG. 1 is a graph of the titration of 200 mM sulfide in fresh rumen contents with 1M MnCl2.

As described above, sulfur is commonly ingested by animals in the form of sulfate compounds that are present in feed or water. In the rumen of a ruminant, the sulfate compounds can be converted by microbes into hydrogen sulfide.

As shown in the examples below, it has been found that certain compounds, such as iron (II) chloride and manganese (II) chloride act as sulfide binding agents and can be used in order to bind sulfide ion. As such, sulfide binding agents can be used in accordance with various compositions and methods included herein in order to mitigate the adverse effects of excessive dietary sulfur intake by binding with sulfide ion and forming an insoluble metal salt, thereby effectively reducing the bioavailability of sulfur. In an embodiment the invention includes a method for reducing ruminal sulfide concentrations comprising administering to an animal an effective amount of a composition including a sulfide binding agent.

In some embodiments, compositions included herein can be mixed in with animal feed, thereby simplifying dosing. In this manner, the composition can act as a feed conditioning agent. Therefore, in an embodiment, the invention includes a feed conditioning composition including a sulfide binding agent.

Saponins, described more fully below, have various beneficial dietary properties when fed to animals. Some embodiments of compositions herein can include an amount of saponins. For example, in an embodiment, the invention includes a feed conditioning composition including saponins and a sulfide binding agent.

In various embodiment, the invention includes methods of treating animals, such as methods for treating animals for dietary sulfur overload. An exemplary method can include a step of identifying animals with ruminal concentrations of sulfide ion exceeding a threshold amount. The threshold amount can be 100 ppm in a particular embodiment, though it could be higher or lower in other embodiments. For example in some embodiments the threshold can be 300 ppm or 450 ppm. Animals can be identified through testing procedures including, for example, sampling rumen fluid. Then, after particular animals are identified, the method can include a step of administering a composition including a sulfide binding agent to them.

In other embodiments, a method of treating animals can include identifying animals subject to high dietary intake of sulfur and then administering to the identified animals an effective amount of a composition including a sulfide binding agent. Animals subject to high dietary intake of sulfur can be identified by testing the sulfur content of animal feed materials and/or water supplies.

In other embodiments, a method of treating animals can include identifying animals exhibiting symptoms of excessive dietary sulfur intake and then administering to the identified animals an effective amount of a composition including a sulfide binding agent. Symptoms can include, but are not limited to, restlessness, diarrhea, muscular twitching, dyspnea, and reduced feed intake.

Compositions included with embodiments herein can be formulated in various ways. For example compositions herein can be formulated as a liquid, slurry, dry powder, dry granular mix, paste, pellets, block, or the like. Compositions may be administered to an animal as a pill, a bolus, or a liquid drench.

In accordance with embodiments included herein, compositions including a sulfide binding agent can be administered to an animal along with the animal's feed ration. For example, a composition, such as a liquid composition, can be mixed in with an animal's feed ration. In some embodiments, a composition, such as a liquid composition, can be mixed in with an animal's water.

While not limiting the scope herein, it is believed that liquid formulations of compositions can be advantageous because of the ease with which liquids can be fed through metering systems and then mixed into feed rations. In addition, liquid formulations can be advantageous because active ingredients, such as sulfide binding agents, can be kept in an active soluble form, as opposed to dry forms where it may be necessary to resolubilize the active agent.

Sulfide Binding Agents

As described above, various embodiments of the invention can include sulfide binding agents. Sulfide binding agents are compounds that can react with sulfide ions and form reaction products that are poorly soluble. In this manner, sulfide binding agents can react with sulfide ions to form a precipitate product that cannot be absorbed well by the host animal, thereby preventing dietary sulfur from causing adverse effects. As a specific example, iron (II) chloride reacts with sulfide ion forming iron sulfide, which is poorly soluble and therefore drops out of solution.

Exemplary sulfide binding agents can include metal containing compounds. For example, exemplary sulfide binding agents can include metal salts. In particular, exemplary sulfide binding agents can include salts of iron and salts of manganese. Specific examples can include iron (II) chloride and/or manganese (II) chloride. Other possible salts can include salts of zinc, chromium, cobalt, and copper.

Because compositions herein are to be administered to animals, directly or indirectly, the sulfide binding agent should be substantially non-toxic. In addition, the sulfide binding agent should be selected so that any reaction products that may form in the process of binding sulfide ion are also substantially non-toxic.

Compositions included within embodiments herein can include an amount of sulfide binding agents effective to reduce the concentration of sulfide ion within the digestive system of an animal, such as within the rumen of an animal, by converting it into insoluble forms. Specific dosing of sulfide binding agents can depend on various factors including the amount of sulfur compounds in the animal's feed and/or water, the species being treated, sensitivities of the animal, and the like.

In some embodiments, the sulfide binding agent is administered at a dosage of between about 1 mg/kg and about 3000 mg/kg. In some embodiments, the sulfide binding agent is administered at a dosage of between about 1 mg/kg and about 1000 mg/kg. In some embodiments, the sulfide binding agent, such as $MnCl_2$ is administered at a dosage of about 20 mg/kg to about 250 mg/kg. In some embodiments, the sulfide binding agent, such as $FeCl_2$ is administered at a dosage of about 50 mg/kg to about 250 mg/kg.

Animal Feed Materials

In an embodiment, the invention includes a method of processing animal feed including contacting an animal feed material with a composition including a sulfide binding agent. By adding the composition to the animal feed, dosing can be simplified as the composition will reach the rumen along with the feed. In some embodiments, methods can include a step of testing the sulfur content of animal feed materials. If the animal feed material turns out to have a relatively high sulfur content, then a composition as described herein can be added to the animal feed.

It will be appreciated that animal feed materials can include many different components such as, but not limited to, alfalfa hay, alfalfa haylage, almond hulls, apple components, rolled barley, barley malt sprouts, barley silage, bermuda grass, blood meal, bluegrass, brome, canary grass, canola seed, canola meal, chocolate byproduct, dried citrus pulp, clover, sudangrass hay, dry-rolled corn, tempered-rolled corn, steam-flaked corn, ground shelled corn, cracked corn, hominy feed, corn gluten feed, corn silage, wet brewer's grain, dry brewer's grain, distillers grains (dried and wet), stillage, soybean meal, soybean seeds, soybean hulls, sunflower meal, sunflower oil, sunflower seeds, tomato products, wheat bran, rolled wheat, wheat hay, wheat middlings, wheat silage, whey, fescue, fish byproducts, hay, legumes, linseed, meat meal, meat and bone meal, rolled oats, oat hay, oat silage, orchard grass, peanut meal, potato byproduct meal, rice bran, rye, safflower, dry rolled sorghum, steam-flaked sorghum, sorghum silage, soybean hulls, whole cottonseed, cottonseed hulls, cottonseed meal, sugar beet pulp, dehydrated beet pulp, bakery waste, cottonseed meal, yellow grease, white grease, vegetable oil, tallow, water, hydrolyzed feather meal, cane molasses, sugar beat molasses, and the like, and combinations thereof.

In some embodiments, the animal feed material can specifically include byproducts of ethanol production. For example in some embodiments, the animal feed material can specifically include distillers dried grains, distillers wet grains, and/or stillage.

Saponins

Various compositions herein can include saponins and/or saponin compositions. Saponins are natural plant surfactants that occur in over 500 different plant species belonging to some 80 different families. They are generally recognized by their strong foaming action when placed in water, which has made them especially useful in the manufacture of foods, beverages, shampoos, wetting agents and pharmaceuticals.

Saponins are classified as surfactants because they have both lipophilic and hydrophilic "regions". Thus, the surfactant activity of saponins is a result of both fat-soluble and water-soluble moieties in the same molecule. The lipophilic region may be a steroid, triterpene, or alkaloid, and is termed a sapogenin. The hydrophilic "region" contains one or more water-soluble carbohydrate side chains. The structural complexity of saponins is derived largely from the carbohydrate portion of the molecule due to the many different types of possible side chain carbohydrates, such as glucose, xylose, galactose, pentose or methylpentose, which may have different connectivity and/or anomeric configuration. Saponins have an antiprotozoal activity attributed to the saponin's ability to interact with cholesterol in protozoal cell membranes and cause cell lysis.

Saponins useful in the present invention can be extracted from plants of the family: Lillaecae, genus: *Yucca*, such as *Yucca schidigera*. Yucca derived saponins generally have steroidal sapogenins. Sarsasapogenin is the major sapogenin found in the *Yucca schidigera* plant. Saponins useful in the present invention can also extracted from plants of the family: Amaryllidaccae, genus: *Agave*, which grows extensively in the southwestern United States and in Mexico. Additional sources of saponins can include extracts of soybeans, fenugreek, peas, tea, yams, sugar beets, alfalfa, asparagus, aloe, vanilla, zhimu, *Sapindus saponaria*, citrus fruits (limonoid saponins) as well as from *Quillaja saponaria* bark. Saponins can be extracted from plant materials in accordance with techniques well-known by those of skill in the art.

The typical saponin content that naturally occurs in Yucca plants is from 0.1-2% saponins by weight. Yucca extracts can be derived by extracting yucca powder with an aqueous solution that may or may not contain some fraction of organic solvent such as methanol, ethanol, propanol, butanol, or the like.

Commercially available Yucca extracts can have total solids content usually in the range from 5-50%. The saponin content of a typical 50 brix (50% solids by weight) yucca extract is usually in the range of about 1-2% saponins by weight as measured by HPLC analysis. Another method of measuring total saponin content is the extraction of all soluble components into a butanol extract followed by gravimetric analysis of the compounds dissolved in the butanol fraction. Measuring saponin content by the butanol extract method typically results in higher numbers than the more advanced HPLC method. Accordingly, the typical 50 brix (50% solids by weight) yucca extract is usually in the range of about 5-20% saponins content by weight as measured by the butanol extract method.

In an embodiment, the composition can include at least 0.1% by weight saponins as measured by HPLC. In an embodiment, the composition can include at least 0.5% by weight saponins as measured by HPLC. In an embodiment, the composition can include at least 1.0% by weight saponins as measured by HPLC. In an embodiment, the composition can include at least 2.0% by weight saponins as measured by HPLC.

It will be appreciated that methods and compositions of the invention can be used for the treatment of animals, including bovine, fowl, porcine, ovine, and equine species. By way of example, the methods and compositions of the invention can be used for the treatment of cattle, chickens, turkeys, ducks, quail, geese, pigs, and sheep. In a specific embodiment, the methods and compositions of the invention can be used for the treatment of ruminants.

It will be appreciated that compositions in accordance with embodiments herein can include various additives. By way of example, compositions can also include additives such as water, propylene glycol, Vitamin E (as di-alpha-tocopheryl acetate), Vitamin A Propionate, Vitamin A Palmitate, Vitamin B1, Vitamin B2, Vitamin B6, Vitamin B12, D-Activated Animal Sterol (source of Vitamin D3), yeast components, dried egg solids, dried casein, and dried whey, amongst others.

Aspects of the present invention may be better understood with reference to the following examples. These examples are intended to be representative of specific embodiments of the invention, and are not intended as limiting the scope of the invention.

EXAMPLE 1

Sulfide Removal from Rumen Fluid with $MnCl_2$

The content of the liquid within the rumen is a complex mixture of various chemical components including enzymes, acids, proteins, and the like. This example was undertaken to measure the effect of a sulfide binding agent, in this case $MnCl_2$, on sulfide ion concentrations in the presence of rumen fluid.

Fresh undiluted rumen fluid was obtained from rumen fistulated Holstein cows. 1.5 ml of a saturated solution of $Na_2S$ in water (approximately 2.7 M) was added to 18.5 ml of the rumen fluid. Sodium sulfide solutions were quantified by titration using a silver/sulfide electrode (Orion, Ion Plus Silver/Sulfide 9616BNWP) and a commercial lead standard (0.1 M $Pb^{2+}$, Orion 948206). The final concentration for sulfide ion in the rumen fluid was approximately 200 mM. This solution was then titrated with a 1 M solution of $MnCl_2$ in water. The progress of the reaction was followed using the silver/sulfide electrode. The data are shown in Table 1 below. The data are also shown in FIG. 1.

TABLE 1

| 1M $MnCl2$ | mVolts (Negative Value) |
| --- | --- |
| 0.0 | 952.6 |
| 0.3 | 950.5 |
| 0.5 | 947.7 |
| 0.7 | 947.8 |
| 0.9 | 940.4 |
| 1.1 | 929.7 |
| 1.4 | 918.4 |
| 1.6 | 899.9 |
| 1.8 | 882.2 |
| 2.0 | 861.5 |
| 2.3 | 850.2 |
| 2.5 | 830.5 |
| 2.7 | 808.9 |

TABLE 1-continued

| 1M MnCl2 | mVolts (Negative Value) |
|---|---|
| 2.9 | 777.1 |
| 3.2 | 735.7 |
| 3.4 | 702.0 |
| 3.6 | 686.7 |
| 3.9 | 678.2 |
| 4.1 | 672.4 |
| 4.3 | 667.8 |
| 4.5 | 664.4 |
| 4.7 | 661.8 |
| 4.9 | 658.9 |
| 5.2 | 656.6 |
| 5.4 | 654.6 |
| 6.0 | 649.8 |

As can be seen, the addition of $MnCl_2$ was effective to reduce the concentration of sulfide ion within the rumen fluid. As such, this example shows that $MnCl_2$ (manganese (II) chloride) can be used to reduce the concentration of sulfide ion in the rumen.

EXAMPLE 2

Sulfide Removal from Rumen Fluid with $FeCl_2$

This example was undertaken to measure the effect of a sulfide binding agent, in this case $FeCl_2$, on sulfide ion concentrations in the presence of rumen fluid.

Figure 2:
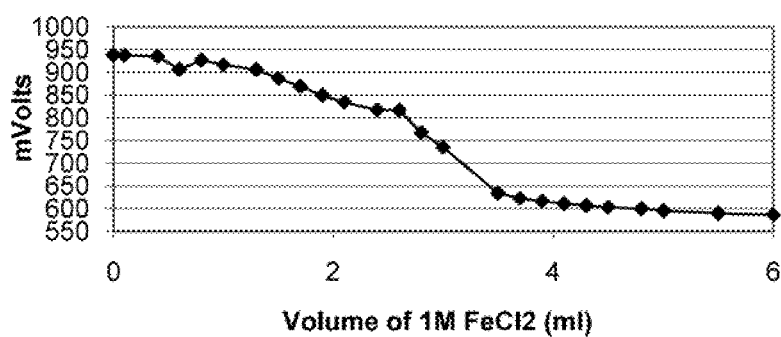
FIG. 2 is a graph of the titration of 200 mM sulfide in fresh rumen contents with 1M FeCl2.

Fresh undiluted rumen fluid was obtained from rumen fistulated Holstein cows. 1.5 ml of saturated solution of $Na_2S$ in water (approximately 2.7 M) was added to 18.5 ml of the rumen fluid. The final concentration of sulfide ion in the rumen fluid was approximately 200 mM. This solution was then titrated with a 1 M solution of $FeCl_2$ in water. The progress of the reaction was followed using the same silver/sulfide electrode set-up described above (Orion, Ion Plus Silver/Sulfide 9616BNWP). The data are shown in Table 2 below. The data are also shown in FIG. 2.

TABLE 2

| 1M FeCl2 | mVolts (Negative Value) |
|---|---|
| 0.0 | 937.5 |
| 0.1 | 937.5 |
| 0.4 | 935.1 |
| 0.6 | 906.2 |
| 0.8 | 926.7 |
| 1.0 | 916.9 |
| 1.3 | 905.8 |
| 1.5 | 886.6 |
| 1.7 | 869.4 |
| 1.9 | 849.4 |
| 2.1 | 833.9 |
| 2.4 | 817.3 |
| 2.6 | 816.8 |
| 2.8 | 767.2 |
| 3.0 | 735.5 |
| 3.5 | 634.0 |
| 3.7 | 622.8 |
| 3.9 | 616.3 |
| 4.1 | 610.8 |
| 4.3 | 607.2 |
| 4.5 | 603.3 |
| 4.8 | 600.0 |
| 5.0 | 595.7 |
| 5.5 | 590.0 |
| 6.0 | 586.5 |

As can be seen, the addition of $FeCl_2$ was effective to reduce the concentration of sulfide ion within the rumen fluid. As such, this example shows that $FeCl_2$ (iron (II) chloride) can be used to reduce the concentration of sulfide ion in the rumen.

EXAMPLE 3

Figure 3:
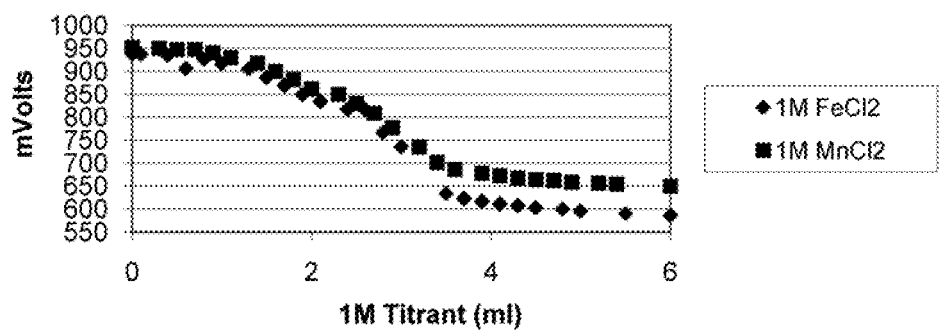
FIG. 3 is a graph of the titration of 200 mM sulfide in fresh rumen contents (Fe vs. Mn).

Comparison of $MnCl_2$ versus $FeCl_2$ $FeCl_2$ on Sulfide Ion Concentration of Rumen Fluid Data taken from Examples 1 and 2 above were plotted together in order to gauge the relative efficacy of $MnCl_2$ versus $FeCl_2$ in removing sulfide ion from rumen fluid. The result is shown in FIG. 3. As can be seen, the use of $FeCl_2$ resulted in lower total sulfide ion concentrations in the rumen fluid.

EXAMPLE 4

Figure 4:
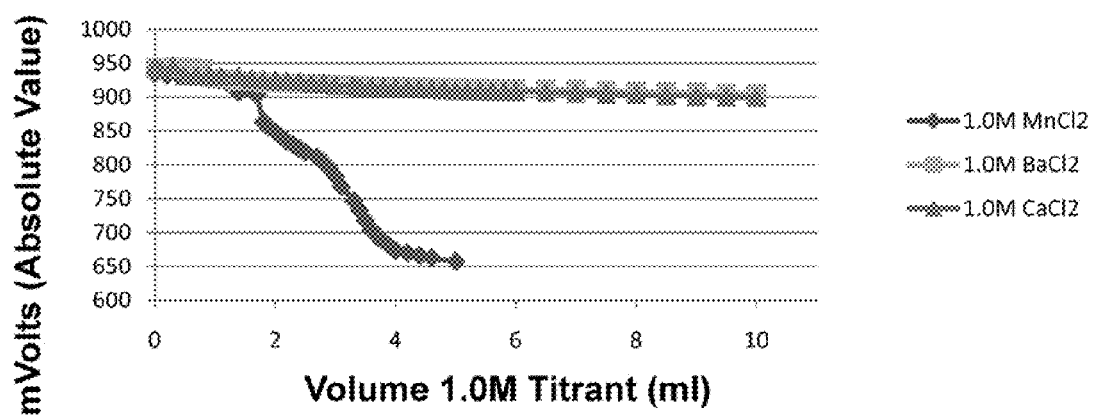
FIG. 4 is a graph of the titration of 200 mM $Na_2S$ with 3 titrants.

Comparison of $MnCl_2$ versus $BaCl_2$ and $CaCl_2$ on Sulfide Ion Concentration of Rumen Fluid 24 hour old undiluted rumen fluid from rumen fistulated Holstein cows was obtained. 4 ml of $Na_2S$ in water (approximately 1 M) was added to 16 ml of the rumen fluid. The final concentration of sulfide ion in the rumen fluid was approximately 200 mM. This solution was then titrated with either a 1 M solution of $MnCl_2$ in water, a 1 M solution of $BaCl_2$ in water, or a 1 M solution of $CaCl_2$ in water. The progress of the reaction was followed using the same silver/sulfide electrode set-up described above (Orion, Ion Plus Silver/Sulfide 9616BNWP). The data are shown in Table 3 below. The data are also shown in FIG. 4.

TABLE 3

| 1.0M MnCl2 | | 1.0M BaCl2 | | 1.0M CaCl2 | |
|---|---|---|---|---|---|
| Volume | mVolts | Volume | mVolts | Volume | mVolts |
| 0.0 | 934.0 | 0.0 | 942.6 | 0.0 | 945.1 |
| 0.2 | 931.7 | 0.3 | 943.7 | 0.1 | 939.8 |
| 0.4 | 931.6 | 0.4 | 943.3 | 0.3 | 944.8 |
| 0.6 | 930.7 | 0.6 | 942.7 | 0.5 | 931.6 |
| 0.8 | 929.4 | 0.8 | 941.3 | 0.7 | 931.3 |
| 1.0 | 926.6 | 1.0 | 927.0 | 0.9 | 931.2 |
| 1.2 | 921.4 | 1.2 | 925.6 | 1.1 | 931.1 |
| 1.4 | 906.6 | 1.4 | 923.3 | 1.4 | 930.7 |
| 1.7 | 903.0 | 1.6 | 922.5 | 1.6 | 927.1 |
| 1.8 | 863.5 | 1.8 | 921.5 | 1.8 | 925.7 |
| 1.9 | 855.2 | 2.0 | 920.9 | 2.0 | 924.8 |
| 2.0 | 848.1 | 2.2 | 920.5 | 2.2 | 923.8 |
| 2.1 | 841.7 | 2.4 | 920.0 | 2.4 | 923.0 |
| 2.2 | 834.5 | 2.6 | 919.7 | 2.6 | 921.0 |
| 2.3 | 829.2 | 2.8 | 918.8 | 2.8 | 920.2 |
| 2.4 | 823.9 | 3.0 | 918.1 | 3.0 | 917.5 |
| 2.5 | 817.9 | 3.2 | 917.7 | 3.3 | 916.8 |
| 2.7 | 811.4 | 3.4 | 917.2 | 3.4 | 915.6 |
| 2.8 | 804.0 | 3.6 | 916.7 | 3.6 | 914.9 |
| 2.9 | 794.9 | 3.8 | 916.0 | 3.8 | 914.3 |
| 3.0 | 783.1 | 4.0 | 915.6 | 4.0 | 913.7 |
| 3.1 | 767.9 | 4.2 | 915.0 | 4.2 | 913.1 |
| 3.3 | 746.6 | 4.4 | 914.8 | 4.4 | 912.6 |
| 3.4 | 733.1 | 4.6 | 914.4 | 4.6 | 912.1 |
| 3.5 | 718.3 | 4.8 | 913.9 | 4.8 | 911.0 |
| 3.6 | 704.2 | 5.0 | 913.6 | 5.0 | 910.1 |
| 3.7 | 694.2 | 5.2 | 913.0 | 5.2 | 909.9 |
| 3.8 | 687.0 | 5.4 | 913.0 | 5.4 | 909.5 |
| 3.9 | 679.7 | 5.6 | 912.7 | 5.6 | 908.9 |
| 4.0 | 674.1 | 5.8 | 912.0 | 5.8 | 908.5 |
| 4.2 | 670.1 | 6.0 | 911.7 | 6.0 | 908.0 |
| 4.4 | 665.4 | 6.5 | 910.7 | 6.5 | 906.7 |

TABLE 3-continued

| 1.0M MnCl$_2$ | | 1.0M BaCl$_2$ | | 1.0M CaCl$_2$ | |
|---|---|---|---|---|---|
| Volume | mVolts | Volume | mVolts | Volume | mVolts |
| 4.6 | 661.8 | 7.0 | 910.8 | 7.0 | 905.5 |
| 5.0 | 657.1 | 7.5 | 909.5 | 7.5 | 904.5 |
| | | 8.0 | 908.3 | 8.0 | 903.3 |
| | | 8.5 | 907.4 | 8.5 | 902.3 |
| | | 9.0 | 906.8 | 9.0 | 901.3 |
| | | 9.5 | 905.7 | 9.5 | 900.3 |
| | | 10.0 | 905.0 | 10.0 | 899.6 |

As can be seen, the use of MnCl$_2$ resulted in substantially lower total sulfide ion concentrations in the rumen fluid than either BaCl$_2$ or CaCl$_2$.

EXAMPLE 5

Precipitating Activity of MnCl$_2$ versus MnO and MnO$_2$

Figure 5:
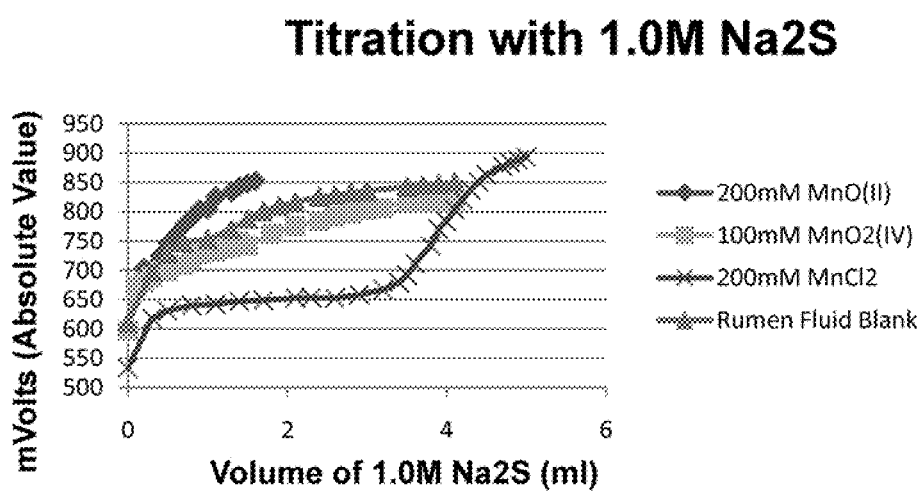
FIG. 5 is a graph of titration with 1.0 M $Na_2S$.

Fresh undiluted rumen fluid was obtained from rumen fistulated Holstein cows. 4 ml of 1.0M MnCl2 solution was added to 16 ml rumen fluid resulting in a 200 mM solution. Next, 0.28 g of MnO(II) was placed in a 100 ml beaker and 20 ml of rumen fluid was added. Then 0.17 g of MnO$_2$(IV) was placed in 100 ml beaker and 20 ml of rumen fluid was added. Each of these compositions, in addition to a rumen fluid control, was then titrated with a 1.0M solution of Na$_2$S. The progress of the reaction was followed using the same silver/sulfide electrode set-up described above (Orion, Ion Plus Silver/Sulfide 9616BNWP). The data are shown in Table 4 below. The data are also shown in FIG. 5.

TABLE 4

| 200 mM MnCl$_2$ | | 200 mM MnO(II) | | 100 mM MnO$_2$(IV) | | Rumen Fluid Blank | |
|---|---|---|---|---|---|---|---|
| Vol 1M Na$_2$S | mVolts | Vol 1M Na$_2$S | mVolts | Vol 1M Na$_2$S | mVolts | Vol 1M Na$_2$S | mVolts |
| 0.0 | 533.2 | 0.0 | 604.6 | 0.0 | 597.2 | 0.0 | 610.7 |
| 0.3 | 617.3 | 0.1 | 674.0 | 0.1 | 672.5 | 0.3 | 697.5 |
| 0.5 | 631.2 | 0.2 | 702.9 | 0.2 | 679.4 | 0.5 | 728.9 |
| 0.8 | 640.0 | 0.3 | 724.5 | 0.3 | 688.1 | 0.7 | 747.9 |
| 1.1 | 641.8 | 0.4 | 745.7 | 0.4 | 698.0 | 1.0 | 753.1 |
| 1.4 | 647.5 | 0.5 | 760.6 | 0.5 | 699.4 | 1.3 | 770.3 |
| 1.7 | 649.0 | 0.6 | 777.3 | 0.7 | 709.7 | 1.5 | 787.6 |
| 2.1 | 652.1 | 0.7 | 789.8 | 0.8 | 720.0 | 1.7 | 800.9 |
| 2.3 | 653.0 | 0.8 | 803.7 | 0.9 | 728.2 | 1.9 | 810.0 |
| 2.6 | 652.6 | 0.9 | 803.9 | 1.0 | 738.1 | 2.1 | 815.8 |
| 2.9 | 658.0 | 1.0 | 825.2 | 1.1 | 732.5 | 2.4 | 825.5 |
| 3.2 | 667.2 | 1.1 | 833.7 | 1.2 | 737.4 | 2.6 | 828.3 |
| 3.4 | 678.8 | 1.3 | 843.1 | 1.3 | 740.0 | 2.8 | 832.0 |
| 3.5 | 691.3 | 1.4 | 848.0 | 1.4 | 749.2 | 3.0 | 835.2 |
| 3.6 | 710.6 | 1.5 | 852.1 | 1.5 | 742.7 | 3.5 | 842.6 |
| 3.8 | 742.0 | | | 1.8 | 762.4 | 3.7 | 845.4 |
| 3.9 | 770.9 | | | 2.1 | 776.0 | 3.9 | 847.3 |
| 4.0 | 783.4 | | | 2.4 | 784.3 | 4.1 | 850.1 |
| 4.1 | 804.1 | | | 2.6 | 791.9 | | |
| 4.2 | 820.2 | | | 2.8 | 796.6 | | |
| 4.3 | 837.8 | | | 3.0 | 803.1 | | |
| 4.4 | 851.7 | | | 3.2 | 806.0 | | |
| 4.5 | 863.4 | | | 3.5 | 817.4 | | |
| 4.7 | 877.0 | | | 3.7 | 817.0 | | |
| 4.8 | 883.6 | | | 3.9 | 816.5 | | |
| 4.9 | 888.2 | | | 4.1 | 817.2 | | |
| 5.0 | 893.2 | | | | | | |

As can be seen, the use of MnCl$_2$ was much more effective in precipitating sulfide ion than either MnO(II) or MnO$_2$(IV).

EXAMPLE 6

Effect of MnCl$_2$ Supplementation on Cattle

In this example, forty-six Angus based feeder calves were blocked by sex (heifers and steers) and assigned within block to one of two treatments. One group (one pen of steers and one pen of heifers) was fed a commercially available feed additive including Yucca extract (SARSTART® DSC, SarTec Corporation, Anoka, Minn.) mixed into the feedlot supplement. An amount of MnCl$_2$ and FeCl$_2$ was mixed into the supplement such that the animals received approximately 0.55 grams per head per day of MnCl$_2$ and 10.0 grams per head per day of FeCl$_2$. The supplement also contained minerals, vitamins, RUMENSIN® (300 mg/hd/d), and carrier feed products including corn, barley sprouts, and distillers grains. The other group (control) was fed the same supplement and diet without the MnCl$_2$.

The cattle that received the SarTemp® with Sulfur Guard™ treatment had substantially increased dry matter intake and average daily gains. The results (DMI=dry matter intake, ADG=average daily gain) are shown below in Table 5.

TABLE 5

| | Control | MnCl$_2$ |
|---|---|---|
| Number of Head | 23 | 23 |
| Start wt., (lb) | 972.45 | 966.05 |
| End wt., (lb) | 1133.3 | 1147.5 |
| DMI, lb/head/day | 22.07 | 23.18 |
| ADG, lb/head/day | 3.45 | 3.58 |
| Feed Efficiency (DM/gain) | 6.41 | 6.48 |

The claims are:
1. A method of processing animal feed comprising:
   mixing a composition in to an animal's feed ration, the composition comprising a yucca extract and a sulfide binding agent, the sulfide binding agent comprising a metal salt selected from the group consisting of iron (II) chloride and manganese (II) chloride, the sulfide binding agent having a concentration of at least about 0.2% by weight of the composition,
   wherein the sulfide binding agent is present in the animal's feed ration at a concentration sufficient to provide a dosage of sulfide binding agent between about 1 mg per kg weight of the animal and 1000 mg per kg weight of to the animal.
2. The method of claim 1, the yucca extract present in the composition at a concentration of at least about 0.1% by weight of the composition.
3. A method of treating animals comprising
   identifying animals with ruminal concentrations of sulfide ion exceeding 100 ppm;
   administering to the identified animals an effective amount of a composition comprising a sulfide binding agent, the sulfide binding agent comprising a metal containing compound wherein the composition comprises at least about 0.2% by weight of the sulfide binding agent.
4. The method of claim 3, the metal containing compound comprising a metal salt selected from the group consisting of iron (II) chloride and manganese (II) chloride.

5. The method of claim 3, the composition further comprising a saponin composition.

6. The method of claim 5, the saponin composition comprising a plant extract.

7. The method of claim 6, the plant extract comprising an extract of agave, yucca, soybeans, citrus, fenugreek, peas, tea, yams, sugar beets, alfalfa, asparagus, aloe, vanilla, zhimu, *Sapindus saponaria*, or *Quillaja saponaria*.

8. The method of claim 5, the plant extract comprising yucca extract.

9. The method of claim 5, the saponin composition comprising sarsaponins.

10. The method of claim 5, the saponin composition comprising a liquid composition.

11. The method of claim 1, further comprising testing the sulfur content of the animal feed material.

12. A method of treating animals comprising:
   selecting animals with ruminal concentrations of sulfide ion exceeding 100 ppm;
   mixing a composition in to feed rations, the composition comprising a yucca extract and a sulfide binding agent, the sulfide binding agent comprising a metal salt selected from the group consisting of iron (II) chloride and manganese (II) chloride; and
   administering the feed rations to the selected animals.

* * * * *

UNITED STATES PATENT AND TRADEMARK OFFICE
CERTIFICATE OF CORRECTION

PATENT NO. : 9,826,761 B2
APPLICATION NO. : 12/572187
DATED : November 28, 2017
INVENTOR(S) : Larry C. McNeff et al.

It is certified that error appears in the above-identified patent and that said Letters Patent is hereby corrected as shown below:

On the Title Page

Item (75) in the Inventors section -- "Mark Axel Rasmussen, Severn, MD" should read --Mark Axel Rasmussen, Anoka, MN--

Item (75) in the Inventors section -- "Sharon Franklin, Severn, MD" should read --Sharon Franklin, Anoka, MN--

In the Claims

In Claim 1, Line 52, -- "of to the animal." should read --of the animal.--

In Claim 8, Line 9, -- "The method of claim 5," should read --The method of claim 6,--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*